(12) United States Patent
Chabach et al.

(10) Patent No.: US 11,479,286 B2
(45) Date of Patent: Oct. 25, 2022

(54) FLEXIBLE AND STRETCHABLE HEATERS OF HIGH ROBUSTNESS FOR AUTOMOTIVE APPLICATIONS

(71) Applicant: IEE INTERNATIONAL ELECTRONICS & ENGINEERING S.A., Echternach (LU)

(72) Inventors: Driss Chabach, Noertrange (LU); Cédric Amorosi, Gorcy (FR)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 23 days.

(21) Appl. No.: 17/043,438

(22) PCT Filed: Mar. 28, 2019

(86) PCT No.: PCT/EP2019/057833
§ 371 (c)(1),
(2) Date: Sep. 29, 2020

(87) PCT Pub. No.: WO2019/185776
PCT Pub. Date: Oct. 3, 2019

(65) Prior Publication Data
US 2021/0024116 A1    Jan. 28, 2021

(30) Foreign Application Priority Data

Mar. 30, 2018 (LU) .................... LU100754
Apr. 23, 2018 (LU) .................... LU100775

(51) Int. Cl.
*B62D 1/06* (2006.01)
(52) U.S. Cl.
CPC ..................... *B62D 1/06* (2013.01)
(58) Field of Classification Search
None
See application file for complete search history.

(56) References Cited

U.S. PATENT DOCUMENTS

| 6,495,799 B1 | 12/2002 | Pillsbury, IV et al. |
| 2003/0102296 A1* | 6/2003 | Nelson ................. B60N 2/5685 219/217 |

(Continued)

FOREIGN PATENT DOCUMENTS

| EP | 0582734 A1 | 2/1994 |
| WO | WO2015024909 A1 | 2/2015 |
| WO | WO2016096815 A1 | 6/2016 |

OTHER PUBLICATIONS

International Search Report corresponding to International Application No. PCT/EP2019/057833, dated May 27, 2019, 3 pages.

(Continued)

*Primary Examiner* — Vicky A Johnson
(74) *Attorney, Agent, or Firm* — Reising Ethington P.C.

(57) ABSTRACT

A flexible electric heating device includes a planar flexible carrier foil, at least two electrically conductive bus lines attached to a surface of the carrier foil, and at least one electric heating member, including first and second electrically conductive electrodes, electrically connected to one of the bus lines. Each electrode has at least one curved edge, wherein the curved edges are located at a distance and are facing each other. The heating member further includes a resistive heater layer, at least partially overlapping the curved edges of the electrodes to form a resistive connecting region. The curved edges are arranged such that locations of the resistive connecting region are facing the first electrode or the second electrode in directions parallel to at least three mutually orthogonal directions that lie in the carrier foil, wherein one of the orthogonal directions is aligned parallel to an edge of the carrier foil.

19 Claims, 5 Drawing Sheets

(56) References Cited

U.S. PATENT DOCUMENTS

2011/0233183 A1* 9/2011 Saunders .............. B32B 27/065
  219/204
2016/0205726 A1   7/2016 Spielmann et al.
2017/0355391 A1  12/2017 Wittkowski et al.
2018/0027612 A1*  1/2018 Roberts .................... H05B 3/34
  219/541

OTHER PUBLICATIONS

Written Opinion corresponding to International Application No. PCT/EP2019/057833, dated May 27, 2019, 5 pages.

* cited by examiner

PRIOR ART

FLEXIBLE AND STRETCHABLE HEATERS OF HIGH ROBUSTNESS FOR AUTOMOTIVE APPLICATIONS

TECHNICAL FIELD

The invention relates to a flexible electric heating device, in particular for automotive application, and an electrically heated vehicle steering wheel comprising at least one such flexible electric heating device.

BACKGROUND

Heating devices are widely used in the automotive industry for providing passenger comfort for instance by heating a vehicle compartment in general and/or passenger seats and/or in a vehicle steering wheel right after start-up of a vehicle engine at cold ambient conditions.

One requirement for such heating devices is that they should be unnoticeable to the vehicle user if not put into operation. This requirement generally rules out the use of conventional heating wires. Alternative solutions have been proposed in the prior art that employ foil heater members, i.e. heater members having the appearance of a thin flexible foil or film.

For instance, international application WO 2015/024909 A1 describes a foil heater for a heating panel. The foil heater comprises a first and a second spiral resistive heating trace formed in a first and a second layer, respectively, that conforms to a flat or curved surface. Each of the first and second resistive heating traces has a center and at least one outer extremity. An electrically insulating layer is arranged between the first and second layer. The electrically insulating layer comprises an opening that accommodates an electrical via, through which the first and second resistive heating traces are electrically contacted with each other. The foil heater is compatible with operation at lower temperature. Due to their spiral shape, the heating traces can be routed densely over the entire heating surface substantially without crossings. A significantly more uniform temperature distribution can thus be achieved.

The geometry of a conventional vehicle steering wheel places higher demands on an "unnoticeable" installation at the steering wheel than an even or a slightly curved surface, as wrinkles must not be present despite the curved surface. Another requirement is that a heater member should cover an as large as possible surface of the steering wheel.

A solution particularly for steering wheel heating is described by international application WO 2016/096815 A1, in which a planar flexible carrier is proposed for use in steering wheel heating and/or sensing. The planar carrier, which can be employed for mounting on a rim of a steering wheel without wrinkles, comprises a portion of planar flexible foil of roughly rectangular shape having two longitudinal sides and two lateral sides. A length B of the lateral sides is 0.96 to 1.00 times the perimeter of the rim. A number of N cut-outs per unit length are provided on each of the longitudinal sides, wherein the cut-outs of one side are located in a staggered fashion relative to opposing cut-out portions on the opposite side.

In one embodiment, a planar, flexible carrier which covers a maximum of the rim surface area supports a parallel electrical heating circuit and so constitutes a heating element. Two of these heating elements are attached on the steering wheel rim so that their contacted sides abut to each other and contacts of the same electrical potential are also abutting. The planar, flexible carrier consists of thermostabilized, 75 µm polyester foil. The foil serves as a substrate for the polymer thick film (PTF) electrical heating circuit which is applied in three printing passes by flat bed or rotary screen printing. The parallel electrical circuit is applied using a highly conductive PTF silver for the feedlines and for heating, and a low conductive PTF carbon black exhibiting positive temperature coefficient of resistivity (PTCR) characteristics for heating. A print thickness is typically between 5 and 15 µm. The document also describes the use of a stretchable planar flexible foil as a planar carrier for further shaping enhancement.

SUMMARY

It is therefore desirable to provide a heating device, particularly for automotive applications, having at least one flexible heater member and exhibiting improved robustness during installation and operation.

Conventional electric heating devices are often designed such that electrically highly conductive bus lines BL are connected to resistive heater elements RH in a parallel configuration (FIG. 1), for instance via stab lines SL. Any compression, bending and/or elongation stress that may be applied by an operator during installation or, for instance by a seat occupant in case of a seat heating device, may compromise an electrical resistance of one or more resistive heater elements RH to increase due to formed cracks or fissures, resulting in a reduced heating power, up to an extent that may eventually lead to the electric heating device becoming non-operable. This is particularly true if mechanical stress is applied to a resistive heater element RH in a direction D of extension of the resistive heater element RH between the electrically conductive stab lines SL.

In one aspect of the present invention, the object is achieved by a flexible electric heating device, in particular for automotive application, that comprises a planar flexible carrier foil, at least two electrically conductive bus lines attached to a surface of the flexible carrier foil and at least one electric heating member. The at least one electric heating member includes a first electrically conductive electrode, a second electrically conductive electrode and at least one resistive heater layer that is attached to the surface of the flexible carrier foil.

Each of the electrodes is attached to the surface of the flexible carrier foil and is electrically connected to one of the bus lines. Each electrode comprises at least one curved edge, and the curved edges of the electrodes are located at a distance and are facing each other. The resistive heater layer at least partially overlaps, in a direction perpendicular to the surface of the flexible carrier foil, the curved edges of the first electrode and the second electrode to form a resistive connecting region between the first electrode and the second electrode.

The curved edges are arranged such that, seen in the direction perpendicular to the surface of the flexible carrier foil, locations of the resistive connecting region that are arranged outside the overlapping part are facing the first electrode or the second electrode in directions parallel to at least three mutually orthogonal directions that lie in the planar flexible carrier foil, wherein one of the orthogonal directions is aligned parallel to an edge of the planar flexible carrier foil.

The flexible electric heating device is particularly beneficial for automotive applications, i.e. for use in vehicles. The term "vehicle", as used in this application, shall particularly be understood to encompass passenger cars, trucks, tractor units and buses.

The phrase "resistive connecting region", as used in this application, shall in particular be understood as a portion of the resistive heater layer that actually carries electric current when the electric heating device is put into operation.

It is further noted herewith that the terms "first", "second", etc. are used in this application for distinction purposes only, and are not meant to indicate or anticipate a sequence or a priority in any way.

Figure 1:
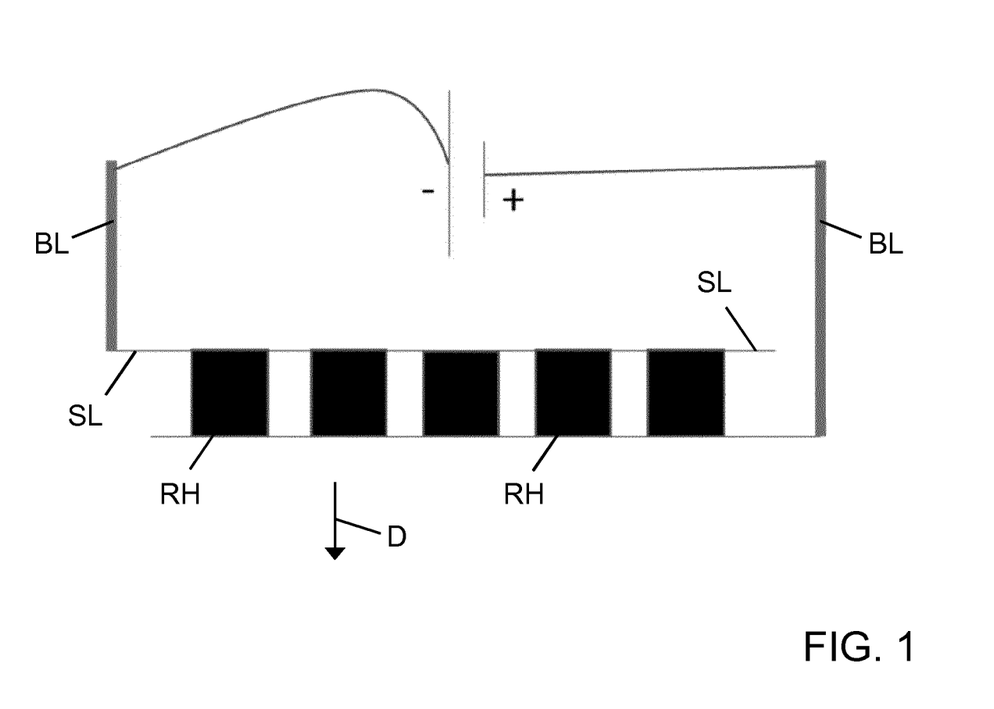
FIG. 1 schematically illustrates a conventional electric heating device with a plurality of heating members, FIG. 2 schematically illustrates a flexible electric heating device in accordance with an embodiment of the invention, FIG. 3 schematically illustrates a flexible electric heating device in accordance with an embodiment of the invention with heating members of an alternative design, FIG. 4 schematically illustrates a flexible electric heating device in accordance with an embodiment of the invention with heating members of another alternative design.

It has been determined that cracks or fissures generated in a resistive heater layer of a configuration similar to the one shown in FIG. 1 by applying an intolerably high bending or stretching stress, respectively, have a higher probability to occur in preferred directions with respect to the bending that causes them. For instance, the occurrence of cracks or fissures extending substantially perpendicular to the direction of a bending-related tensile or compressive stress field is much more probable than the occurrence of cracks or fissures extending parallel to this direction.

By forming the electrically conductive electrodes and the at least one resistive heater layer in the proposed way to provide a resistive connection between the first electrode and the second electrode in a plurality of general directions, it is possible to maintain resistive connections between the first electrode and the second electrode even in the event of an occurrence of a crack or a fissure due to applied mechanical stress. By that, an increase of an electric resistance in a direction perpendicular to the direction of the cracks has less significant impact on the total resistance of the connection. Indeed, the resistance parallel to any occurring cracks or fissured is only little or not affected at all. The electric connection thus presents an electrical resistance that is less prone to show dramatic variations caused by applied bending/stretching stress, so that the robustness of the flexible electric heating device can be substantially improved.

The curved edge of the first electrode and/or the curved edge of the second electrode may be formed as a plurality of edges of consecutively arranged straight lines connected in series to build up a polygonal path, thereby approximating a curved edge.

Preferably, the flexible electric heating device comprises a plurality of electric heating members, wherein the plurality of electric heating members is divided into subsets of electric heating members that are characterized in that the conductive electrodes of a subset of electric heating members are electrically connected to one of the bus lines by the same electric line. In this way, larger areas can be covered and evenly heated by the flexible electric heating device. At least in some embodiments, the electric line may also be referred to as a stub line.

In preferred embodiments of the electric heating device, the curved edge of the first electrode is formed as a circular arc of a first radius, and the curved edge of the second electrode is formed as a circular arc of a second radius that is larger than the first radius. The circular arcs are arranged in a substantially concentric manner. The second circular arc forms a central angle that is larger than $$180° - 2 \arcsin\left(\frac{R_1}{R_2}\right)$$

by at least 30%, wherein $R_1$ and $R_2$ denote the first radius and the second radius, respectively. The circular arcs are arranged symmetrically about a direction that is arranged parallel to an edge of the planar flexible carrier foil. In this way, resistive connections between the first electrode and the second electrode can effectively be maintained in the event of an occurrence of a crack or a fissure due to applying an intolerably high mechanical stress, and an improved robustness of the electric heating device can be achieved.

In preferred embodiments of the electric heating device, the curved edge of the first electrode and the curved edge of the second electrode at least partially run parallel to each other. By that, resistive connections between the first electrode and the second electrode can be established in a plurality of general directions, and thus some of the resistive connections can be maintained with high probability if a crack or a fissure occurs after applying an intolerably high mechanical stress.

Preferably, each of the first electrically conductive electrode and the second electrically conductive electrode comprises a plurality of consecutive curved edges of alternating curvature that are arranged to run parallel to each other to form an undulated pattern. In this way, electric heating members with the above-described robustness with respect to applying an intolerably high mechanical stress that are able to cover and to heat a larger area can be provided.

Preferably, the planar flexible carrier foil is stretchable. The term "stretchable", as used in this application, shall be understood such that the planar flexible carrier foil of the at least one electric heating member can be stretched by an operator during installation or by a user of the electric heating device, for instance a vehicle seat occupant, by an amount between 1% and 3%, preferably up to 4%, and, most preferably, up to 5% of a mechanically unloaded extension length. By employing a stretchable planar flexible carrier foil, the flexible electric heating device can be used with particular advantage in applications with large surface curvature such as a vehicle steering wheel. In such applications, the at least one electric heating member can be installed in a manner that is adapted to a high extent to a surface contour of an object to be heated, and an excellent heat transfer to the object can be enabled.

Preferably, at least one of the first electrically conductive electrode and the second electrically conductive electrode comprises at least one out of silver or copper. In this way, the heating function can be concentrated at the at least one electric heating member when the electric heating device is put into operation.

Preferably, at least one of the first electrically conductive electrode and the second electrically conductive electrode comprises cured electrically conductive ink. Electrically conductive inks are commercially available. In this way, an application of high-precision, cost-effective manufacturing methods such as screen printing and ink jet printing is facilitated, resulting in low manufacturing tolerances, in particular for dimensions in the direction perpendicular to the surface of the planar flexible carrier foil. Preferably, the cured electrically conductive ink comprises at least one out of silver or copper. In general, however, other metal-based inks could be employed that appear to be suitable to those skilled in the art.

Preferably, the at least one resistive heater layer comprises at least one out of carbon black, graphite, graphene, and a material that has an electrical resistivity with a positive temperature coefficient. In this way, an effective heating function of the at least one resistive heater layer can be ensured.

Preferably, the at least one resistive heater layer comprises cured resistive ink. Electrically resistive inks with positive temperature coefficient are readily commercially available. The electrically resistive ink may be applied by screen printing or ink jet printing or by any other method that appears to be suitable to those skilled in the art.

In preferred embodiments of the electric heating device, the planar flexible carrier foil is made for the most part from a plastic material that is selected from a group of plastic materials formed by polyethylene terephthalate PET, polyimide PI, polyetherimide PEI, polyethylene naphthalate PEN, polyoxymethylene POM, polyamide PA, polyphthalamide PPA, polyether ether ketone PEEK and combinations of at least two of these plastic materials.

The term "for the most part", as used in this application, shall particularly be understood as equal to or more than 50%, more preferably more than 70%, and, most preferably, more than 80% in volume, and shall encompass a part of 100%, i.e. the planar flexible carrier foil is completely made from the selected plastic material.

These plastic materials can allow for easy manufacturing, and durable, cost-efficient electrically insulating sheets of low manufacturing tolerances can be provided as planar flexible carrier foils.

In preferred embodiments, the planar flexible carrier foil is of an oblong rectangular shape. Long edges of the planar flexible carrier foil are arranged in a direction of mechanical stress to be expected during installation or operation, and the one of the orthogonal directions is aligned parallel to short edges of the planar flexible carrier foil. Such embodiments are beneficially employable for applications with large surface curvature such as a vehicle steering wheel.

An aspect ratio of the planar flexible carrier foil may vary from 1:3 up to 1:20. This can allow a one-piece installation of a flexible electric heating device at long and thin objects, and particularly at a vehicle steering wheel.

In another aspect of the present invention, an electrically heated vehicle steering wheel is provided. The vehicle steering wheel comprises at least one embodiment of the disclosed flexible electric heating device. At least a surface of a vehicle steering wheel rim is covered with the at least one flexible electric heating device with a coverage of at least 80%.

The advantages presented in context with the disclosed electric heating device also apply to the electrically heated vehicle steering wheel.

These and other aspects of the invention will be apparent from and elucidated with reference to the embodiments described hereinafter.

It shall be pointed out that the features and measures detailed individually in the preceding description can be combined with one another in any technically meaningful manner and show further embodiments of the invention. The description characterizes and specifies the invention in particular in connection with the figures.

BRIEF DESCRIPTION OF THE DRAWINGS

Further details and advantages of the present invention will be apparent from the following detailed description of not limiting embodiments with reference to the attached drawing, wherein.

DETAILED DESCRIPTION

Figure 2:
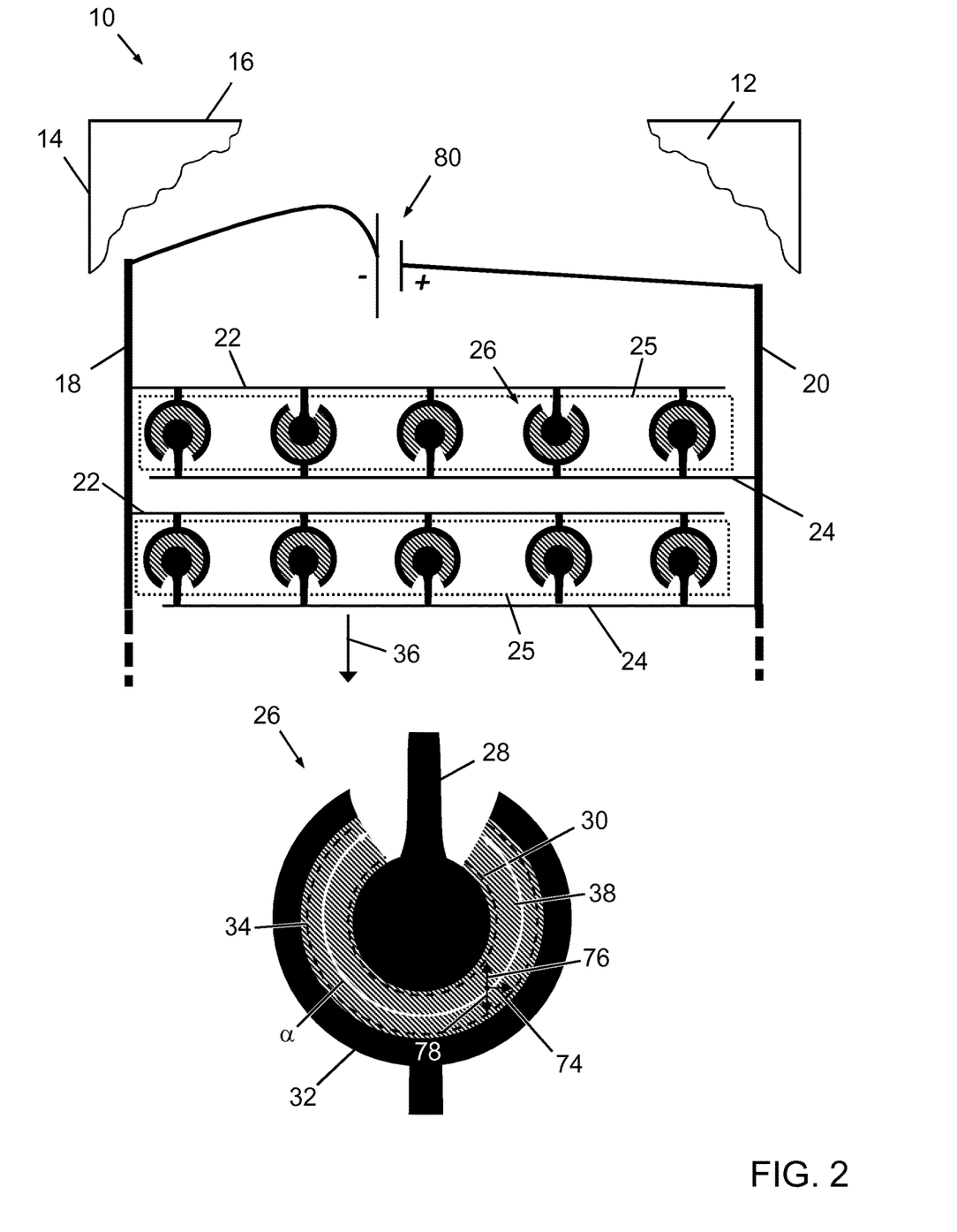

FIG. 2 schematically illustrates a flexible electric heating device 10 in accordance with an embodiment of the invention. The flexible electric heating device 10 is designed for use in an automotive application, and in the present embodiment in particular for use in a heated steering wheel of a vehicle designed as a passenger car.

The flexible electric heating device 10 comprises a planar flexible carrier foil 12 that is completely made from a plastic material, which in the present embodiment is formed by polyimide (PI), with a thickness of, for example, 25 μm, and a width of, for example, 40 mm. The planar flexible carrier foil 12 is of an oblong rectangular shape with two parallel long edges 14 and two parallel short edges 16.

The flexible electric heating device 10 includes two electrically conductive bus lines 18, 20 for providing electric current from an electric power source 80. The two electrically conductive bus lines 18, 20 run parallel to the long edges 14 of the planar flexible carrier foil 12. Electrically conductive stub lines 22, 24, extending inwardly, are alternatingly connected to one of the electrically conductive bus lines 18, 20 along a length of extension of the planar flexible carrier foil 12. The electrically conductive bus lines 18, 20 and the electrically conductive stub lines 22, 24 comprise cured electrically conductive ink containing, in the present embodiment, silver. The electrically conductive ink has been dispensed on the planar flexible carrier foil 12 by applying a screen printing process, followed by a step of curing the ink. In this way, the electrically conductive bus lines 18, 20 and the electrically conductive stub lines 22, 24 have been attached to a surface of the flexible carrier foil 12.

The flexible electric heating device 10 comprises a plurality of electric heating members 26. Subsets 25 of the electric heating members 26, comprising five electric heating members 26 each, are arranged in a spaced manner in an interspace between two consecutive stub lines 22, 24. The electric heating members 26 of one subset 25 are alternately turned upside down for achieving an even heating.

All the electric heating members 26 of the electric heating device 10 are identically designed. Therefore, it will be sufficient to describe the features of the electric heating members 26 exemplarily with reference to one of the electric heating members 26, which is illustrated in FIG. 2 in an enlarged view.

Each electric heating member 26 includes a first electrically conductive electrode 28 and a second electrically conductive electrode 32, which are attached to the surface of the flexible carrier foil 12 and are electrically connected to one of the bus lines 18, 20 via one of the stub lines 22, 24. The first electrode 28 and the second electrode 32 comprise cured electrically conductive ink containing, in the present embodiment, silver, and have been manufactured by applying a similar screen printing process as for the electrically conductive bus lines 18, 20 and stub lines 22, 24.

Each of the first electrode 28 and the second electrode 32 of the electrical heating member 26 comprises a curved edge 30, 34. The curved edge 30 of the first electrode 28 is formed as a circular arc of a first radius $R_1$, and the curved edge 34 of the second electrode 32 is formed as a circular arc of a second radius $R_2$ that is larger than the first radius $R_1$. The circular arcs are arranged in a substantially concentric manner. The circular arc of a second radius $R_2$ forms a central angle α that is larger than $180°-2\arcsin(R_1/R_2)$ by at least 30%, namely by 250%. The circular arcs are arranged symmetrically about a direction 36 that is arranged parallel to the long edges 14 of the planar flexible carrier foil 12. In this way, the curved edges 30, 34 of the electrodes 28, 32 are located at a distance and are facing each other. Further, the curved edge 30 of the first electrode 28 and the curved edge 34 of the second electrode 32 partially run parallel to each other.

In the present embodiment, the circular arcs are arranged in a substantially concentric manner. In alternative embodiments, however, centers of the circular arcs may be offset such that the curved edge of the first electrode and the curved edge of the second electrode do not run in parallel.

Each electric heating member 26 includes a resistive heater layer 38 that is attached to the surface of the flexible carrier foil 12. The resistive heater layer 38 partially overlaps, in a direction perpendicular to the surface of the flexible carrier foil 12, the curved edge 30 of the first electrode 28 and the curved edge 34 of the second electrode 32 to form a resistive connecting region between the first electrode 28 and the second electrode 32. The resistive heater layer 38 comprises cured electrically resistive ink containing, in the present embodiment, carbon black, and has been made by applying a screen printing process, followed by a step of curing the electrically resistive ink.

In this way, the curved edge 30 of the first electrode 28 and the curved edge 34 of the second electrode 32 are arranged such that, seen in the direction perpendicular to the surface of the flexible carrier foil 12, which coincides with the drawing layer of FIG. 2, locations of the resistive connecting region that are arranged outside the overlapping part are facing the first electrode 28 or the second electrode 32 in directions parallel to at least three mutually orthogonal directions 74, 76, 78. The three mutually orthogonal directions 74, 76, 78 lie in the planar flexible carrier foil 12 (the electric heating member 26 is to be considered a 2-D object). This is illustrated exemplarily in FIG. 2 for one location of the resistive connecting region. One direction 74 of the three orthogonal directions 74, 76, 78 is aligned parallel to the short edges 16 of the planar flexible carrier foil 12.

The planar flexible carrier foil 12 is stretchable. The 25 μm polyimide foil has a width of 40 mm and can be stretched by an amount of 5% by applying a force of about 90 N. In an application, the planar flexible carrier foil 12 of the flexible electric heating device 10 will be arranged such that the long edges 14 are arranged in parallel to a direction of mechanical stress to be expected. In this configuration, cracks or fissures will most likely occur in a direction that is perpendicular to the long edges 14. A worst case would be the occurrence of such crack in the resistive connecting region that runs through the apex of the first electrode 28. The large central angle α of the second circular arc provides enough reserve for maintaining a resistive connection between the first electrode 28 and the second electrode 32.

Figure 3:
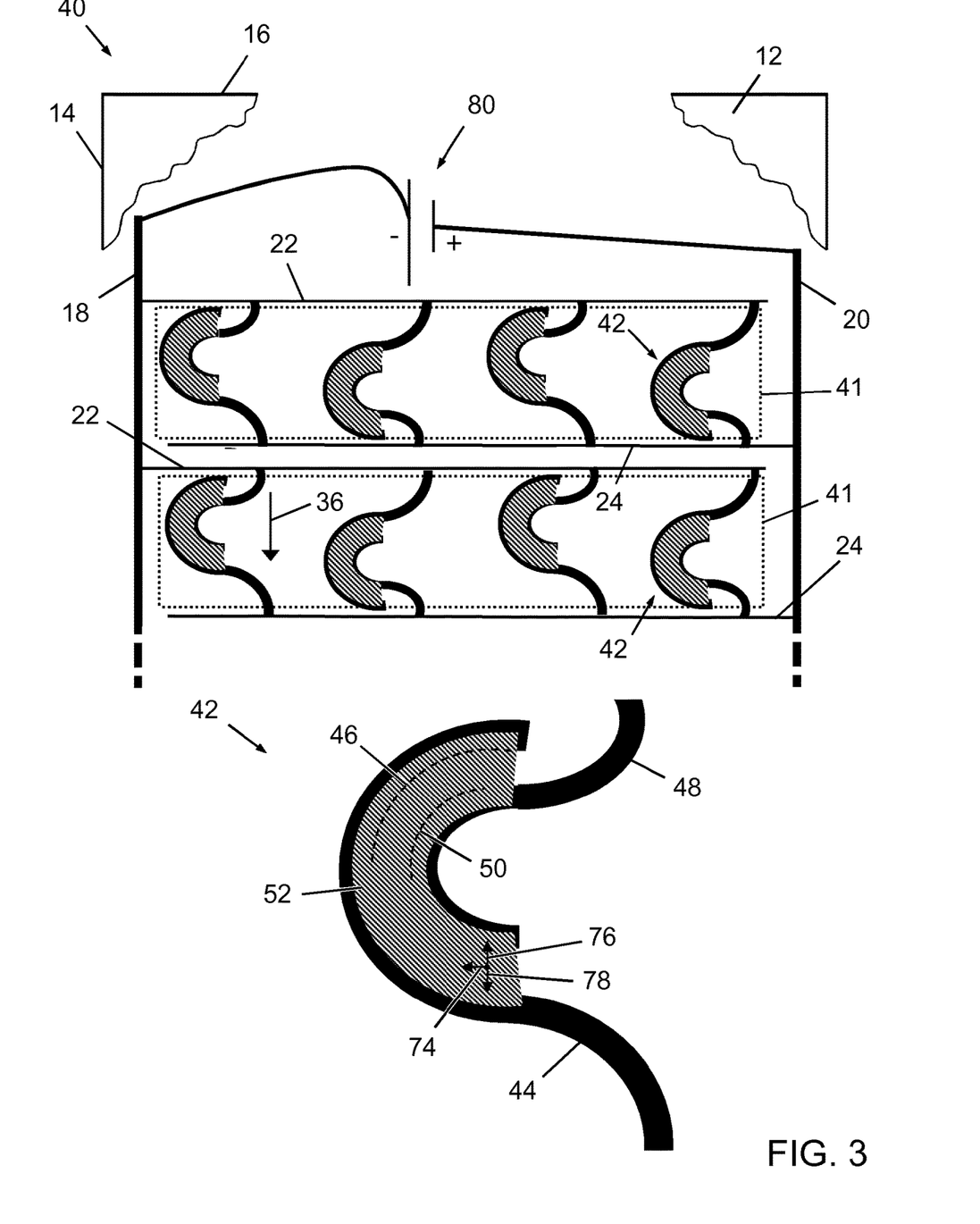
Figure 4:
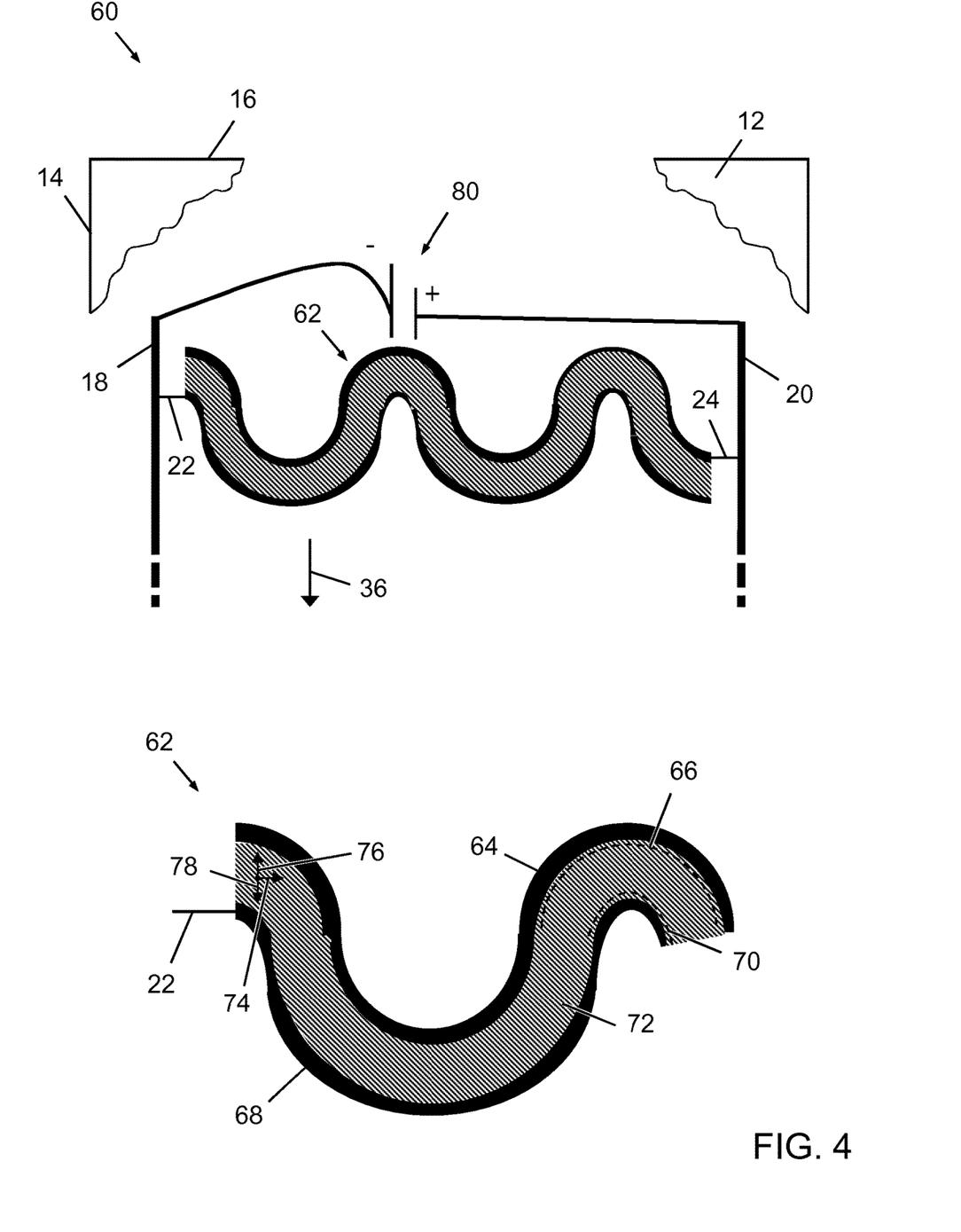

In FIGS. 3 and 4, alternative possible embodiments of the flexible electric heating device in accordance with the invention are schematically illustrated in the same view as in FIG. 2. In order to avoid unnecessary repetition, only differences between the various embodiments will be described in the following.

FIG. 3 schematically illustrates a flexible electric heating device 40 in accordance with an embodiment of the invention with electric heating members 42 of an alternative design.

The flexible electric heating device 40 comprises a plurality of electric heating members 42. Subsets 41 of the electric heating members 42, comprising four electric heating members 42 each, are arranged in a spaced manner in an interspace between the two consecutive stub lines 22, 24. The electric heating members 42 of one subset 41 are alternately turned upside down for achieving an even heating.

Again, all the electric heating members 42 of the electric heating device 40 are identically designed, and features of electric heating members 42 will be described exemplarily with reference to one of the electric heating members 42, shown in FIG. 3 is an enlarged view.

A first electrically conductive electrode 44 of the electric heating member 42 has the shape of a quarter-circle and a semicircle of opposite curvature connected in series, wherein the quarter-circle end of the first electrode 44 is electrically connected to one of the bus lines 20 via one of the stub lines 24. A second electrically conductive electrode 48 of the electric heating member 42 has the shape of a quarter-circle and a semicircle of opposite curvature connected in series, wherein the quarter-circle end of the second electrode 48 is electrically connected to another one of the bus lines 18 via another one of the stub lines 22. A radius of the quarter-circle part and a radius of the semicircle part of the first electrode 44 is larger than a radius of the quarter-circle part and a radius of the semicircle part of the second electrode 48. The first electrode 44 and the second electrode 48 can be manufactured by the same screen printing process, using the same material as in the embodiment pursuant to FIG. 2.

The first electrode 44 comprises a curved edge 46 formed by an inner edge of the semicircle part. The second electrode 48 comprises a curved edge 50 formed by an outer edge of the semicircle part. The radii of the quarter-circle parts and the radii of the semicircle parts are laid out such that the curved edges 46, 50 of the electrodes 44, 48 are located at a distance and are facing each other. Further, the curved edge 46 of the first electrode 44 and the curved edge 50 of the second electrode 48 run parallel to each other.

Each electric heating member 42 includes a resistive heater layer 52 that partially overlaps the inner edge of the semicircle part of the first electrode 44 and the outer edge of the semicircle part of the second electrode 48 to form a resistive connecting region between the first electrode 44 and the second electrode 48. The resistive heater layer 52 can be manufactured by the same screen printing process, using the same material as in the embodiment pursuant to FIG. 2.

Locations of the resistive connecting region that are arranged outside the overlapping part are facing the first electrode 44 or the second electrode 48 in directions parallel to at least three mutually orthogonal directions 74, 76, 78 that lie in the planar flexible carrier foil 12, one of the three orthogonal directions 74, 76, 78 being aligned parallel to the short edges 16 of the planar flexible carrier foil 12.

Cracks or fissures in the resistive heater layer 52 due to applying an intolerably large stress in a direction 36 parallel to the long edges 14 of the planar flexible carrier foil 12 will most likely occur in a direction that is perpendicular to the long edges 14. As can readily be learned from FIG. 3, the resistive heating layer 52 in this case provides enough reserve for maintaining a resistive connection between the first electrode 44 and the second electrode 48.

FIG. 4 schematically illustrates a flexible electric heating device 60 in accordance with an embodiment of the invention with electric heating members 62 of another alternative design.

The flexible electric heating device 60 comprises a plurality of electric heating members 62, which are evenly spaced apart along the direction parallel to the long edges 14 of the planar carrier foil 12. Only one electric heating member 62 of the plurality of electric heating members 62 is shown in FIG. 4.

Again, all the electric heating members 62 of the electric heating device 60 are identically designed, and features of the electric heating members 62 will be described exemplarily with reference to one of the electric heating members 62, a detail of which is shown in FIG. 4 in an enlarged view.

A first electrically conductive electrode 64 of the electric heating member 62 has the shape of a quarter-circle, four semicircles and another quarter-circle connected in series, wherein curvatures of the consecutive quarter-circle and semicircle, respectively, alternate. The quarter-circle end of the first electrode 64 is electrically connected to one of the bus lines 20 via one of the stub lines 24. A second electrically conductive electrode 68 of the electric heating member 62 has the shape of a quarter-ellipse, a semicircle, a semi-ellipse, another semicircle, another semi-ellipse and a quarter-circle connected in series, wherein curvatures of the consecutive quarter-ellipse, the semicircles, the semi-ellipses and the quarter-circle, respectively, alternate. The quarter-ellipse end of the second electrode 68 is electrically connected to another one of the bus lines 18 via another one of the stub lines 22. The first electrode 64 and the second electrode 68 can be manufactured by the same screen printing process, using the same material as in the embodiment pursuant to FIG. 2.

Each of the first electrically conductive electrode 64 and the second electrically conductive electrode 68 comprises a plurality of consecutive curved edges 66, 70 of alternating curvature that are arranged to run parallel to each other to form an undulated pattern by a suitable selection of dimensions of the quarter-ellipse, the semicircles, the semi-ellipses and the quarter-circle, respectively. The curved edge 66 of the first electrically conductive electrode 64 and the curved edge 70 of the second electrically conductive electrode 68 are located at a distance and are facing each other.

Each electric heating member 62 includes a resistive heater layer 72 that partially overlaps the curved edges 66 of the first electrode 64 and the curved edges 70 of the second electrode 68 to form a resistive connecting region between the first electrode 64 and the second electrode 68. The resistive heater layer 72 can be manufactured by the same screen printing process, using the same material as in the embodiment pursuant to FIG. 2.

Locations of the resistive connecting region that are arranged outside the overlapping part are facing the first electrode 64 or the second electrode 68 in directions parallel to at least three mutually orthogonal directions 74, 76, 78 that lie in the planar flexible carrier foil 12, one 74 of the three orthogonal directions 74, 76, 78 being aligned parallel to the short edges 16 of the planar flexible carrier foil 12.

Cracks or fissures in the resistive heater layer 72 due to applying an intolerably large stress in a direction parallel to the long edges 14 of the planar flexible carrier foil 12 will most likely occur in a direction that is perpendicular to the long edges 14. As can readily be learned from FIG. 4, the resistive heating layer 72 in this case provides enough reserve for maintaining a resistive connection between the first electrode 64 and the second electrode 68.

Figure 5:
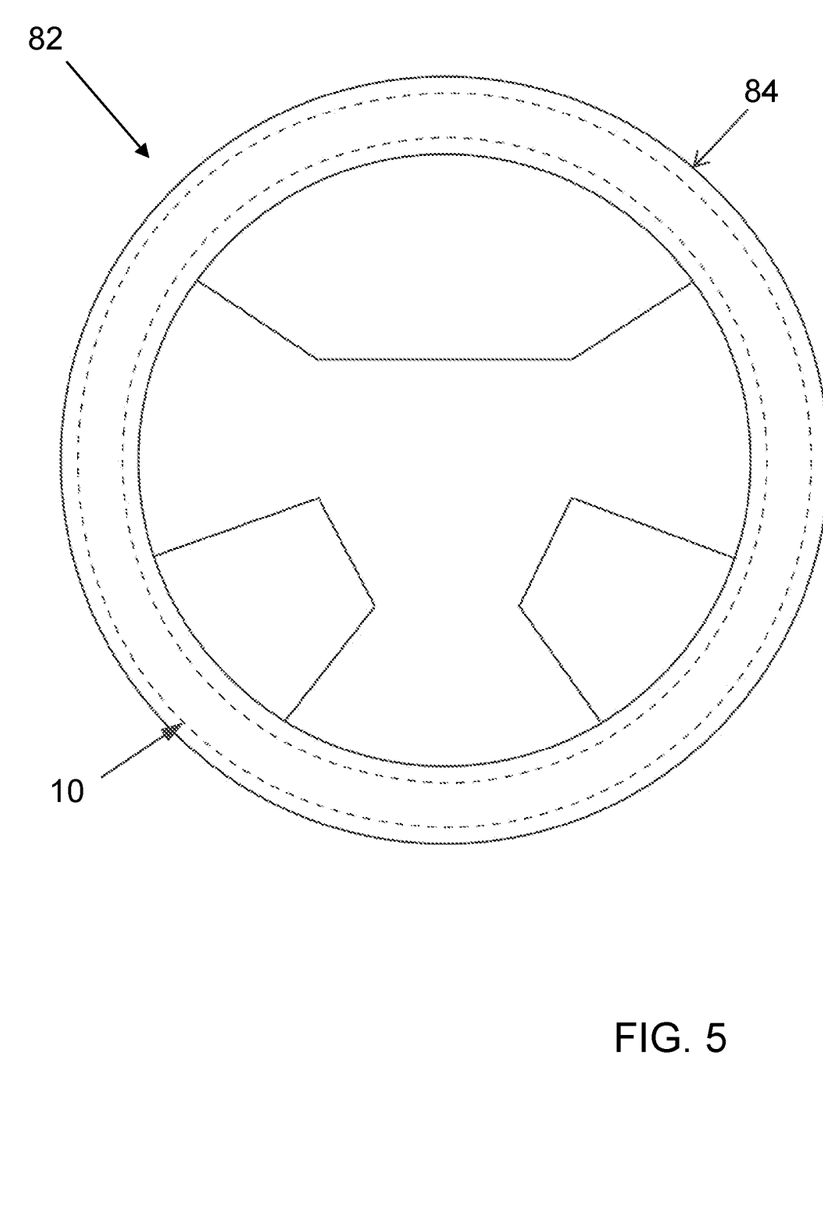
FIG. 5 is a perspective view of an example of a vehicle steering wheel in accordance with an embodiment of the invention.

FIG. 5 illustrates a perspective view of a non-limiting example of an electrically heated vehicle steering wheel 82 that includes at least one embodiment of the disclosed flexible electric heating device 10. In this embodiment, at least a surface of a vehicle steering wheel rim 82 is covered with at least one flexible electric heating device 10, and wherein the coverage is at least 80%.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, which is meant to express a quantity of at least two. The mere fact that certain measures are recited in mutually different dependent claims does not indicate that a combination of these measures cannot be used to advantage. Any reference signs in the claims should not be construed as limiting scope.

The invention claimed is:

1. A flexible electric heating device for automotive application, comprising:
   a planar flexible carrier foil,
   at least two electrically conductive bus lines attached to a surface of the flexible carrier foil,
   at least one electric heating member, including:
      a first electrically conductive electrode and a second electrically conductive electrode, wherein each of the electrodes is attached to the surface of the flexible carrier foil and is electrically connected to one of the bus lines, and each electrode comprises at least one curved edge located at a distance and are facing each other, and wherein the curved edge of the first electrode is formed as a circular arc of a first radius, and the curved edge of the second electrode is formed as a circular arc of a second radius that is larger than the first radius, and wherein the circular arcs are arranged in a substantially concentric manner, and the second circular arc forms a central angle that is larger than $180° - 2\arcsin(R_1/R_2)$ by at least 30%, and wherein the circular arcs are arranged symmetrically about a direction that is arranged parallel to an edge of the planar flexible carrier foil, and
      at least one resistive heater layer that is attached to the surface of the flexible carrier foil, wherein the resistive heater layer at least partially overlaps, in a direction perpendicular to the surface of the flexible carrier foil, the curved edges of the first electrode and the second electrode to form a resistive connecting region between the first electrode and the second electrode,
   wherein the curved edges are arranged such that, seen in the direction perpendicular to the surface of the flexible carrier foil, locations of the resistive connecting region that are arranged outside the overlapping part are facing the first electrode or the second electrode in directions parallel to at least three mutually orthogonal directions that lie in the planar flexible carrier foil, wherein one of the orthogonal directions is aligned parallel to an edge of the planar flexible carrier foil.

2. The electric heating device as claimed in claim 1, comprising a plurality of electric heating members, wherein the plurality of electric heating members is divided into subsets of electric heating members that are characterized in that the conductive electrodes of a subset of electric heating members are electrically connected to one of the bus lines by the same electric line.

3. The electric heating device as claimed in claim 1, wherein the curved edge of the first electrode and the curved edge of the second electrode at least partially run parallel to each other.

4. The electric heating device as claimed in claim 1, wherein each of the first electrically conductive electrode and the second electrically conductive electrode comprises a plurality of consecutive curved edges of alternating curvature that are arranged to run parallel to each other to form an undulated pattern.

5. The electric heating device as claimed in claim 1, wherein the planar flexible carrier foil is stretchable.

6. The electric heating device as claimed in claim 1, wherein at least one of the first electrically conductive electrode and the second electrically conductive electrode comprises at least one out of silver or copper.

7. The electric heating device as claimed in claim 1, wherein the at least one resistive heater layer comprises at least one out of carbon black, graphite, graphene, and a material that has an electrical resistivity with a positive temperature coefficient.

8. The electric heating device as claimed in claim 1, wherein the planar flexible carrier foil is made for the most part from a plastic material that is selected from a group of plastic materials formed by polyethylene terephtalate PET, polyimide PI, polyetherimide PEI, polyethylene naphthalate PEN, polyoxymethylene POM, polyamide PA, polyphthalamide PPA, polyether ether ketone PEEK and combinations of at least two of these plastic materials.

9. The electric heating device as claimed in claim 1, wherein the planar flexible carrier foil is of an oblong rectangular shape, wherein long edges of the planar flexible carrier foil are arranged in a direction of mechanical stress to be expected during installation or operation, and the one of the orthogonal directions is aligned parallel to short edges of the planar flexible carrier foil.

10. An electrically heated vehicle steering wheel, comprising at least one flexible electric heating device as claimed in claim 1, wherein at least a surface of a vehicle steering wheel rim is covered with the at least one flexible electric heating device with a coverage of at least 80%.

11. A flexible electric heating device for automotive application, comprising:
a planar flexible carrier foil,
at least two electrically conductive bus lines attached to a surface of the flexible carrier foil,
at least one electric heating member, including:
a first electrically conductive electrode and a second electrically conductive electrode, wherein each of the electrodes is attached to the surface of the flexible carrier foil and is electrically connected to one of the bus lines, and each electrode comprises at least one curved edge, and wherein the curved edges of the electrodes are located at a distance and are facing each other, and wherein each of the first electrically conductive electrode and the second electrically conductive electrode comprises a plurality of consecutive curved edges of alternating curvature that are arranged to run parallel to each other to form an undulated pattern, and
at least one resistive heater layer that is attached to the surface of the flexible carrier foil, wherein the resistive heater layer at least partially overlaps, in a direction perpendicular to the surface of the flexible carrier foil, the curved edges of the first electrode and the second electrode to form a resistive connecting region between the first electrode and the second electrode,
wherein the curved edges are arranged such that, seen in the direction perpendicular to the surface of the flexible carrier foil, locations of the resistive connecting region that are arranged outside the overlapping part are facing the first electrode or the second electrode in directions parallel to at least three mutually orthogonal directions that lie in the planar flexible carrier foil, wherein one of the orthogonal directions is aligned parallel to an edge of the planar flexible carrier foil.

12. The electric heating device as claimed in claim 11, comprising a plurality of electric heating members, wherein the plurality of electric heating members is divided into subsets of electric heating members that are characterized in that the conductive electrodes of a subset of electric heating members are electrically connected to one of the bus lines by the same electric line.

13. The electric heating device as claimed in claim 11, wherein the curved edge of the first electrode is formed as a circular arc of a first radius, and the curved edge of the second electrode is formed as a circular arc of a second radius that is larger than the first radius, and wherein the circular arcs are arranged in a substantially concentric manner, and the second circular arc forms a central angle that is larger than $180°-2\arcsin(R_1/R_2)$ by at least 30%, and wherein the circular arcs are arranged symmetrically about a direction that is arranged parallel to an edge of the planar flexible carrier foil.

14. The electric heating device as claimed in claim 11, wherein the planar flexible carrier foil is stretchable.

15. The electric heating device as claimed in claim 11, wherein at least one of the first electrically conductive electrode and the second electrically conductive electrode comprises at least one out of silver or copper.

16. The electric heating device as claimed in claim 11, wherein the at least one resistive heater layer comprises at least one out of carbon black, graphite, graphene, and a material that has an electrical resistivity with a positive temperature coefficient.

17. The electric heating device as claimed in claim 11, wherein the planar flexible carrier foil is made for the most part from a plastic material that is selected from a group of plastic materials formed by polyethylene terephtalate PET, polyimide PI, polyetherimide PEI, polyethylene naphthalate PEN, polyoxymethylene POM, polyamide PA, polyphthalamide PPA, polyether ether ketone PEEK and combinations of at least two of these plastic materials.

18. The electric heating device as claimed in claim 11, wherein the planar flexible carrier foil is of an oblong rectangular shape, wherein long edges of the planar flexible carrier foil are arranged in a direction of mechanical stress to be expected during installation or operation, and the one of the orthogonal directions is aligned parallel to short edges of the planar flexible carrier foil.

19. An electrically heated vehicle steering wheel, comprising at least one flexible electric heating device as claimed in claim 12, wherein at least a surface of a vehicle steering wheel rim is covered with the at least one flexible electric heating device with a coverage of at least 80%.

* * * * *